United States Patent
Cheng et al.

(10) Patent No.: US 12,532,392 B2
(45) Date of Patent: Jan. 20, 2026

(54) BACKLIGHT DRIVER OF DRIVING LIGHT-EMITTING DIODE STRING FOR DECREASING HEAT DISSIPATION AND METHOD OF CONTROLLING THE SAME

(71) Applicant: NOVATEK Microelectronics Corp., Hsin-Chu (TW)

(72) Inventors: Jhih-Siou Cheng, New Taipei (TW); Keko-Chun Liang, Hsinchu (TW); Chun-Fu Lin, Taoyuan (TW); Jin-Yi Lin, Kaohsiung (TW); Chieh-An Lin, Taipei (TW); Po-Hsiang Fang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 140 days.

(21) Appl. No.: 18/371,453

(22) Filed: Sep. 22, 2023

(65) Prior Publication Data

US 2025/0106961 A1  Mar. 27, 2025

(51) Int. Cl.
 *H05B 45/30* (2020.01)
 *H05B 45/14* (2020.01)
 *H05B 45/325* (2020.01)

(52) U.S. Cl.
 CPC ........... *H05B 45/14* (2020.01); *H05B 45/325* (2020.01)

(58) Field of Classification Search
 CPC ........ H05B 45/10; H05B 45/14; H05B 45/20; H05B 45/24; H05B 45/30; H05B 45/32; H05B 45/325; H05B 45/34; H05B 45/345; H05B 45/347; H05B 45/37; H05B 45/3725; H05B 45/38; H05B 45/395
 See application file for complete search history.

(56) References Cited

U.S. PATENT DOCUMENTS

| | | | |
|---|---|---|---|
| 2013/0134889 A1* | 5/2013 | Chen | H05B 45/3725 315/193 |
| 2013/0342124 A1* | 12/2013 | Huang | H05B 45/46 315/210 |
| 2021/0315079 A1 | 10/2021 | Gamperl | |

FOREIGN PATENT DOCUMENTS

| | | |
|---|---|---|
| TW | I474313 B | 2/2015 |
| TW | I536344 B | 6/2016 |
| TW | I540569 B | 7/2016 |
| TW | M601945 U | 9/2020 |
| TW | 202304253 A | 1/2023 |

* cited by examiner

*Primary Examiner* — Long Nguyen
(74) *Attorney, Agent, or Firm* — Winston Hsu

(57) ABSTRACT

According to an embodiment of the invention, a backlight driver of driving a light-emitting diode (LED) string via a driving transistor in a load path is provided. The LED string, the driving transistor, and an electrical load are coupled to form the load path. The backlight driver includes a current regulator and a headroom detection circuit. The current regulator is coupled to the driving transistor and the first terminal of the electrical load to control a driving current flowing through the load path according to at least a feedback voltage from a first terminal of the electrical load. The headroom detection circuit is coupled to the first terminal of the electrical load and a voltage regulator to control the voltage regulator to regulate a supply voltage to a first terminal of the LED string according to at least the feedback voltage.

20 Claims, 3 Drawing Sheets

BACKLIGHT DRIVER OF DRIVING LIGHT-EMITTING DIODE STRING FOR DECREASING HEAT DISSIPATION AND METHOD OF CONTROLLING THE SAME

BACKGROUND OF THE INVENTION

1. Field of the Invention

The present invention relates to electronic circuits, and in particular, to a backlight driver of driving a light-emitting diode string for decreasing heat dissipation and a method of controlling the same.

2. Description of the Prior Art

A light-emitting diode (LED) backlight module is a light source for illuminating various types of display devices including televisions, computer monitors, and smartphones. Compared to the traditional backlights, the LED backlight module is more energy-efficient, durable, and has a longer lifespan.

The LED backlight module employs a driving transistor to drive an LED string to generate desired luminance. The LED string, the driving transistor, and a resistor are coupled to form a load path. In the related art, the LED backlight module regulates a supply voltage to the LED string using a gate voltage at a gate terminal of the driving transistor. In operation, the gate voltage of the driving transistor is negatively correlated to the drain voltage of the driving transistor. By monitoring the gate voltage, the LED backlight module estimates the drain voltage, estimates the headroom voltage of the driving transistor accordingly, and regulates the supply voltage according to the headroom voltage, saving power while achieving heat reduction. However, since the characteristics of the driving transistors vary from device to device due to process variation and the operating range of the gate voltage of the driving transistor is large, the estimation of the headroom voltage is therefore imprecise, leading to inefficient power reduction and heat reduction.

In another approach, the LED backlight module regulates the supply voltage to the LED string using the drain voltage at the drain terminal of the driving transistor. However, this approach would increase the pin count in the LED backlight module, leading to an increase in the manufacturing cost.

SUMMARY OF THE INVENTION

According to an embodiment of the invention, a backlight driver of driving a light-emitting diode (LED) string via a driving transistor in a load path is provided. The LED string, the driving transistor, and an electrical load are coupled to form the load path. The electrical load includes a first terminal, and a second terminal coupled to a ground terminal. The backlight driver includes a current regulator and a headroom detection circuit. The current regulator is coupled to the driving transistor and the first terminal of the electrical load to control a driving current flowing through the load path according to at least a feedback voltage from the first terminal of the electrical load. The headroom detection circuit is coupled to the first terminal of the electrical load and a voltage regulator to control the voltage regulator to regulate a supply voltage to a first terminal of the LED string according to at least the feedback voltage from the first terminal of the electrical load.

According to another embodiment of the invention, a backlight driver drives a LED string via a driving transistor in a load path, the LED string, the driving transistor, and an electrical load being coupled to form the load path, the electrical load including a first terminal, and a second terminal coupled to a ground terminal, the backlight driver including a current regulator and a headroom detection circuit, the current regulator being coupled to the driving transistor and the first terminal of the electrical load, the headroom detection circuit being coupled to the first terminal of the electrical load and a voltage regulator. A method of controlling the backlight driver includes the current regulator controlling a driving current flowing through the load path according to at least a feedback voltage from the first terminal of the electrical load, and the headroom detection circuit controlling the voltage regulator to regulate a supply voltage to a first terminal of the LED string according to at least the feedback voltage from the first terminal of the electrical load.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
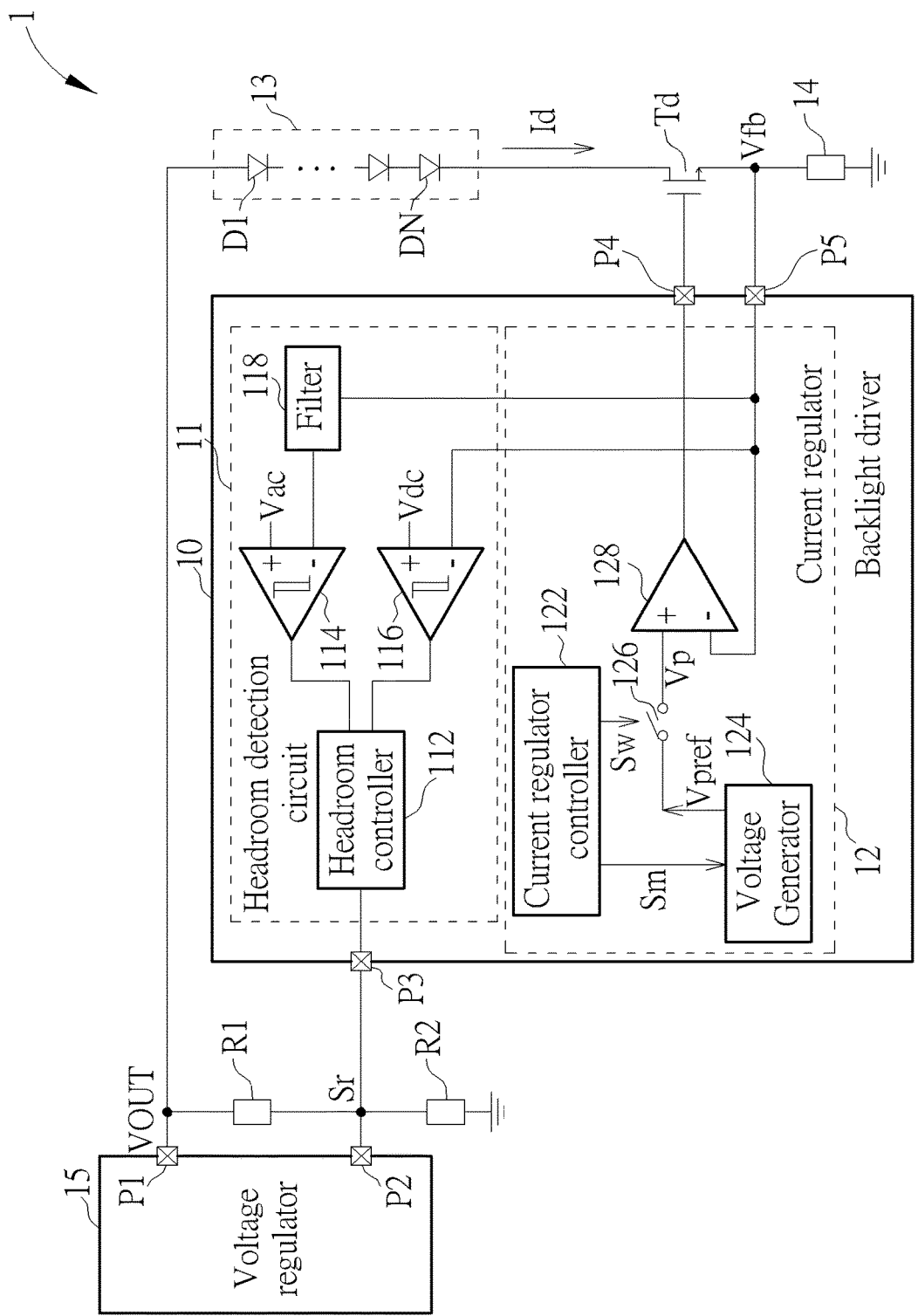
FIG. 1 is a circuit schematic of a light-emitting diode (LED) backlight module according to an embodiment of the invention.

FIG. 1 is a circuit schematic of a light-emitting diode (LED) backlight module 1 according to an embodiment of the invention. The LED backlight module 1 may be adopted in a display device, and may illuminate the display device using LED strings. Further, the LED backlight module 1 may control a supply voltage VOUT fed to the LED strings in order to save energy and reduce heat loss while providing sufficient luminance.

The LED backlight module 1 may include a backlight driver 10, an LED string 13, a driving transistor Td, an electrical load 14, a voltage regulator 15, and resistors R1 and R2. The LED string 13, the driving transistor Td, and an electrical load 14 are coupled to form a load path. Specifically, the LED string 13 includes a first terminal coupled to the voltage regulator 15, and a second terminal. The driving transistor Td includes a control terminal coupled to the backlight driver 10, a first terminal coupled to the second terminal of the LED string 13, and a second terminal. The electrical load 14 includes a first terminal coupled to the second terminal of the driving transistor Td, and a second terminal coupled to a ground terminal. The ground terminal may provide a ground voltage, e.g., 0V. The backlight driver 10 may be coupled to the first terminal of the electrical load 14 and the voltage regulator 15. The LED string 13 may include LEDs D1 to DN sequentially coupled to each other, where N may be a positive integer exceeding 1. For example, N may be 3, and the LEDs D1 to D3 may be sequentially coupled to each other, with the anode of the LED D1 being the first terminal of the LED string 13, and the cathode of the LED D3 being the second of the LED string 13. The driving transistor Td may be an N-type metal-oxide-semiconductor field-effect transistor (MOSFET). The electrical load 14 may be a fixed resistor serving to sense a feedback voltage Vfb. For example, the electrical load 14 may be a 100 ohm resistor. The resistors R1 and R2 may be fixed resistors, forming a voltage divider.

During operation, the LED string 13 may receive the supply voltage VOUT, and may emit light when a driving current Id flows therethrough. The backlight driver 10 may regulate the supply voltage VOUT via the voltage regulator 15, and may drive the LED string 13 via the driving transistor Td using the driving current Id. The driving current Id may include a plurality of pulses, the plurality of pulses each may be equal or different in the magnitudes and pulse widths. In general, the higher average level of the driving current Id is, the brighter the LED string 13 will glow. When the driving current Id flows through the driving transistor Td, the driving transistor Td may experience a voltage drop between the first terminal and the second terminal thereof, referred to as a headroom voltage. If the headroom voltage is excessively high, the power will be wasted in the driving transistor Td, resulting in a heat loss. If the headroom voltage is insufficient, the driving transistor Td will not generate sufficient driving current Id for the LED string 13 to radiate sufficient amount of light. Therefore, the backlight driver 10 may regulate the supply voltage VOUT to an adequate level, saving energy and reducing heat loss while ensuring sufficient luminance.

The backlight driver 10 may be implemented in integrated circuit, and may include a current regulator 12 and a headroom detection circuit 11, and connection ports P3 to P5. The voltage regulator 15 may be a DC-to-DC regulator and may include connection ports P1 and P2. The current regulator 12 is coupled to the control terminal of the driving transistor Td and the first terminal of the electrical load 14 via the connection port P4. The headroom detection circuit 11 is coupled to the first terminal of the electrical load 14 via the connection port P5, and coupled to the voltage regulator 15 via the connection ports P3 and P2. The voltage regulator 15 may be further coupled to the first terminal of the LED string 13 via the connection port P1.

The current regulator 12 may include a current regulator controller 122, a voltage generator 124, a switch 126 and an operational amplifier 128. The current regulator controller 122, the voltage generator 124, and the switch 126 may generate a voltage pulse Vp to control a pulse in the driving current Id. The operational amplifier 128 and the driving transistor Td may form a feedback loop for detecting the feedback voltage Vfb.

The current regulator controller 122 may generate a magnitude control signal Sm and a width control signal Sw to control the magnitude and the pulse width of a pulse, respectively.

The voltage generator 124 is coupled to the current regulator controller 122 to receive the magnitude control signal Sm, control the magnitude of a control reference voltage Vpref according to the magnitude control signal Sm, and output the control reference voltage Vpref. That is, the control reference voltage Vpref may be adjustable in magnitude. In some embodiments, the magnitude control signal Sm may be a voltage signal and the voltage generator 124 may be a voltage-controlled voltage source. In other embodiments, the magnitude control signal Sm may be a current signal and the voltage generator 124 may be a current-controlled voltage source or a digitally controlled voltage source. The magnitude of the magnitude control signal Sm may be positively correlated to the magnitude of the control reference voltage Vpref. For example, the magnitude of the magnitude control signal Sm may be increased to increase the magnitude of the control reference voltage Vpref.

The switch 126 includes a control terminal coupled to the current regulator controller 122 to receive the width control signal Sw, a first terminal coupled to the voltage generator 124 to receive the control reference voltage Vpref, and a second terminal controlling a voltage pulse Vp according to the control reference voltage Vpref and the width control signal Sw. The switch 126 may adjust the pulse width of the voltage pulse Vp according to the width control signal Sw, and adjust the magnitude of the voltage pulse Vp according to the control reference voltage Vpref. The width control signal Sw may be a pulse width modulation (PWM) voltage. In some embodiments, the pulse width of the voltage pulse Vp may be equal to the pulse width of the width control signal Sw, and the magnitude of the voltage pulse Vp may be equal to the magnitude of the control reference voltage Vpref.

The operational amplifier 128 includes an inverting input terminal coupled to the first terminal of the electrical load 14 to receive the feedback voltage Vfb, a non-inverting input terminal coupled to the second terminal of the switch 126 to receive the voltage pulse Vp, and an output terminal coupled to the control terminal of the driving transistor Td. The operational amplifier 128 may control a pulse in the driving current Id according to the feedback voltage Vfb and the voltage pulse Vp. Since the non-inverting input terminal and the inverting input terminal of the operational amplifier 128 may be regarded as a virtual short-circuit in the steady state, the operational amplifier 128 may adjust the control voltage to the control terminal of the driving transistor Td to match the feedback voltage Vfb to the voltage pulse Vp. The control voltage may be negatively correlated to the voltage at the first terminal of the driving transistor Td, and positively correlated to the driving current Id. If the voltage pulse Vp exceeds the feedback voltage Vfb by a large amount, the operational amplifier 128 may increase the control voltage to boost the driving current Id, thereby bringing the feedback voltage Vfb up until the feedback voltage Vfb equal to the voltage pulse Vp. If, however, the supply voltage VOUT is insufficient to supply the driving current Id in the load path, the feedback voltage Vfb will continue to remain less than the voltage pulse Vp despite a large control voltage. For example, if the supply voltage VOUT is 8.1V and the driving current Id is 1mA, the voltage drop across the LED string 13 may be 7V, the headroom voltage of the driving transistor Td may be 1V, and the feedback voltage Vfb across the electrical load 14 may be 0.1V. Since the voltage drop in the load path is 8.1V (=7+1+0.1), the voltage drop in the load path is equal to the supply voltage VOUT, and thus the supply voltage VOUT is sufficient to supply the driving current Id of 1 mA. If the driving current Id is 1mA is rose to 2 mA, ideally, the voltage drop across the LED string 13 may require a voltage drop approximately equal to 7V or exceeding 7V (e.g., 7.3V), the headroom voltage of the driving transistor Td may become less than or equal to 1.3V (the headroom voltage of the driving transistor Td will be reduced if the supply voltage VOUT stays unchanged), and the feedback voltage Vfb across the electrical load 14 may become greater than or equal to 0.2V. However, the voltage drop in the load path now becomes 8.8V (=7.3+1.3+0.2), exceeding the supply voltage VOUT (8.8>8.1), and consequently, the supply voltage VOUT is insufficient to supply the driving current Id of 2 mA, the driving current Id will be adjusted to between 1 mA and 2 mA, resulting in a feedback voltage Vfb between 0.1V and 0.2V and a headroom voltage of the driving transistor Td between 1V and 1.3V. In other words, the headroom voltage is insufficient.

The headroom detection circuit 11 may include a first comparator 116, a filter 118, a second comparator 114, and a headroom controller 112. In some embodiments, the headroom detection circuit 11 may be enabled during a regulation period of regulating the supply voltage VOUT, and may be disabled during a normal period without regulating the supply voltage VOUT. The feedback voltage Vfb may include a direct current (DC) component and alternating current (AC) components. The first comparator 116 may detect the insufficient headroom voltage according to the DC component in the feedback voltage Vfb. The filter 118 and the second comparator 114 may detect the insufficient headroom voltage according to the AC components in the feedback voltage Vfb. The headroom controller 112 may control the voltage regulator 15 to regulate the supply voltage VOUT according to the detection results from the first comparator 116 and the second comparator 114.

The first comparator 116 includes a first input terminal coupled to the first terminal of the electrical load 14 to receive the feedback voltage Vfb, a second input terminal to receive a DC reference voltage, and an output terminal to output a first comparison result according to the feedback voltage Vfb and the DC reference voltage Vdc. The first input terminal of the first comparator 116 may be an inverting input terminal, and the second input terminal of the first comparator 116 may be a non-inverting input terminal. The DC reference voltage Vdc may be generated by a first voltage source, and may be set to a fixed level, e.g., 0.2V. The first comparator 116 may compare the feedback voltage Vfb to the DC reference voltage Vdc to generate the first comparison result. In some embodiments, if the feedback voltage Vfb is less than the DC reference voltage Vdc, the first comparator 116 may set the first comparison result to a logical high level (e.g., 1.8V), representing insufficient headroom detection. If the feedback voltage Vfb is equal to or exceed the DC reference voltage Vdc, the first comparator 116 may set the first comparison result to a logical low level (e.g., 0V), representing sufficient headroom detection.

The filter 118 may be coupled to the first terminal of the electrical load 14 to generate a filtered voltage according to the feedback voltage Vfb. The second comparator 114 includes a first input terminal coupled to the filter 118 to receive the filtered voltage, a second input terminal to receive an AC reference voltage, and an output terminal to output a second comparison result according to the filtered voltage and the AC reference voltage Vac. The first input terminal of the second comparator 114 may be an inverting input terminal, and the second input terminal of the second comparator 114 may be a non-inverting input terminal. The AC reference voltage Vac may be generated by a second voltage source, and may be set to a fixed level equal to or different from the DC reference voltage Vdc. For example, the AC reference voltage Vac may be 0.1V. The second comparator 114 may compare the filtered voltage to the AC reference voltage Vac to generate the second comparison result. In some embodiments, if the filtered voltage is less than the AC reference voltage Vac, the second comparator 114 may set the second comparison result to the logical high level, representing insufficient headroom detection. If the filtered voltage is equal to or exceed the AC reference voltage Vac, the second comparator 114 may set the second comparison result to the logical low level, representing sufficient headroom detection.

The headroom controller 112 may be coupled to the output terminal of the first comparator 116, the output terminal of the second comparator 114 and the voltage regulator 15 to control the voltage regulator 15 to regulate the supply voltage VOUT according to the first comparison result and the second comparison result. If the first comparison result and the second comparison result indicate that the feedback voltage Vfb is less than the DC reference voltage Vdc and/or the filtered voltage is less than the AC reference voltage Vac, the headroom detection circuit 11 may control the voltage regulator 15 to increase the supply voltage VOUT. If the first comparison result and the second comparison result indicate that the feedback voltage Vfb exceeds the DC reference voltage Vdc and the filtered voltage exceeds the AC reference voltage Vac, the headroom detection circuit 11 may control the voltage regulator 15 to decrease the supply voltage VOUT. In some embodiments, the headroom controller 112 may include an OR gate, the OR gate having a first terminal coupled to the output terminal of the first comparator 116 to receive the first comparison result, a second terminal coupled to the output terminal of the second comparator 114 to receive the second comparison result, and an output terminal outputting a result of an bitwise OR operation on the first comparison result and the second comparison result. The headroom controller 112 may generate a regulation signal Sr according to the result of the bitwise OR operation. If the result of the bitwise OR operation indicates the logical high level, the headroom controller 112 may reduce the value of the regulation signal Sr, thereby increasing the supply voltage VOUT; and if the result of the bitwise OR operation indicates the logical low level, the headroom controller 112 may increase the value of the regulation signal Sr, thereby decreasing the supply voltage VOUT.

In some embodiments, the filter 118 and the second comparator 114 may be omitted from the headroom detection circuit 11, the headroom controller 112 may be coupled to the output terminal of the first comparator 116 to regulate the supply voltage VOUT according to the first comparison result. If the first comparison result indicates that the feedback voltage Vfb is less than the DC reference voltage Vdc, the headroom detection circuit 11 may control the voltage regulator 15 to increase the supply voltage VOUT. If the first comparison result indicates that the feedback voltage Vfb exceeds the DC reference voltage Vdc, the headroom detection circuit 11 may control the voltage regulator 15 to decrease the supply voltage VOUT.

Figure 2:
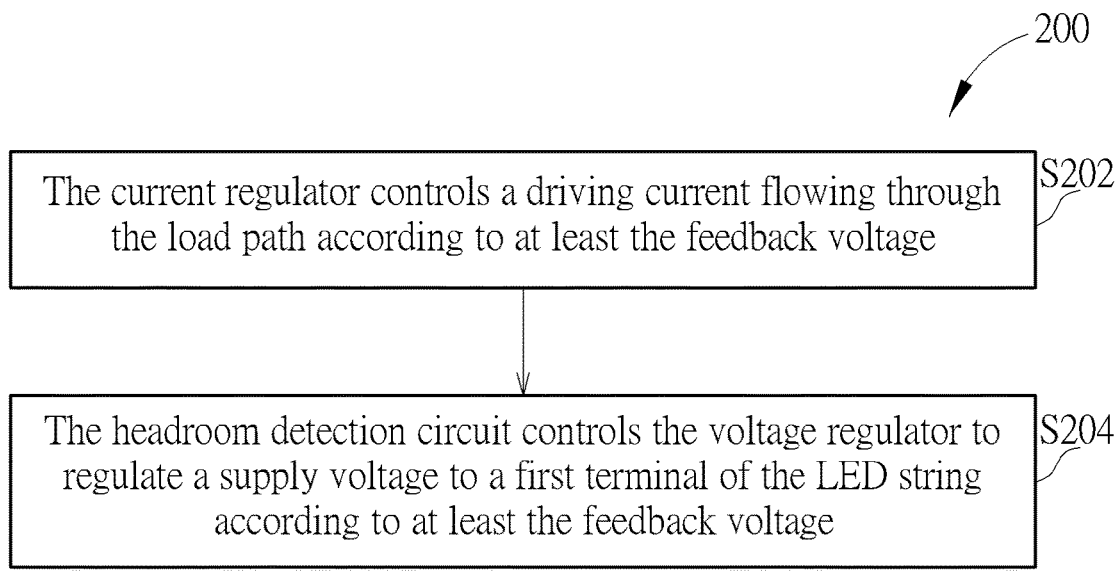
FIG. 2 is a flowchart of a method of controlling the backlight driver in FIG. 1 according to an embodiment of the invention.

FIG. 2 is a flowchart of a method 200 of controlling the backlight driver 10 according to an embodiment of the invention. The method 200 includes Steps S202 and S204 to control both the driving current Id and the supply voltage VOUT according to the feedback voltage Vfb. Any reasonable step change or adjustment is within the scope of the present disclosure. Steps S202 and S204 are detailed as follows:

Step S202: The current regulator 12 controls the driving current Id flowing through the load path according to at least the feedback voltage Vfb from the first terminal of the electrical load 14;

Step S204: The headroom detection circuit 11 controls the voltage regulator 15 to regulate the supply voltage VOUT to a first terminal of the LED string 13 according to at least the feedback voltage Vfb from the first terminal of the electrical load 14.

In Step S202, the current regulator 12 adjusts the driving current Id until the feedback voltage Vfb is equal to the voltage pulse Vp. The current regulator 12 may generate a boosted pulse and a plurality of normal pulses in the driving current Id in a frame according to the magnitude control signal Sm and the width control signal Sw. The driving current Id may include the boosted pulse and the plurality of normal pulses in the frame as in FIG. 3 to achieve an efficient headroom voltage control, the details of FIG. 3 will be provided in the subsequent paragraphs. The plurality of normal pulses may have equal magnitudes and equal pulse widths. The boosted pulse may have a magnitude exceeding that of the normal pulses, and a pulse width less than that of the normal pulses. A product of the magnitude and the pulse width of the boosted pulse is equal to a product of the magnitude and the pulse width of the normal pulse in the driving current. The current regulator 12 may adjust the magnitude of the normal pulses and the magnitude of the boosted pulse according to magnitude control signal Sm, and adjust of the normal pulses and the magnitude of the boosted pulse according to the width control signal Sw In this manner, the current regulator 12 controls the generation of the boosted pulse and normal pulses in the driving current Id, so as to reduce screen flickering and enhance user experience. In some embodiments, the current regulator 12 may adjust the magnitude of the normal pulses and the magnitude of the boosted pulse according to magnitude control signal Sm and the feedback voltage Vfb, and adjust of the normal pulses and the magnitude of the boosted pulse according to the width control signal Sw and the feedback voltage Vfb.

In Step S204, if the feedback voltage Vfb is less than the DC reference voltage Vdc and/or the filtered voltage is less than the AC reference voltage Vac, the headroom detection circuit 11 controls the voltage regulator 15 to increase the supply voltage VOUT; and if the feedback voltage Vfb exceeds the DC reference voltage Vdc and the filtered voltage exceeds the AC reference voltage Vac, the headroom detection circuit 11 controls the voltage regulator 15 to decrease the supply voltage VOUT. In this manner, the headroom detection circuit 11 controls the voltage regulator 15 to regulate the supply voltage VOUT.

The LED backlight module 1 adopts the method 200 to control both the driving current Id and the supply voltage VOUT according to the feedback voltage Vfb, thereby saving the pin count and reducing the manufacturing cost of the backlight driver 10 comparing to the conventional approach of regulating the supply voltage VOUT according to the drain voltage of the driving transistor Td. Compared with the conventional approach of estimating the headroom voltage and regulating the supply voltage using the gate voltage of the driving transistor, the LED backlight module 1 employs the feedback voltage Vfb to regulate the supply voltage VOUT. Since the feedback voltage Vfb directly reflects the driving current Id, the LED backlight module 1 may regulate the supply voltage in a precise manner, so to precisely adjust the driving current Id to the desired level, achieving efficient power reduction and heat reduction. Further, the current regulator 12 employs the boosted pulse in the driving current Id to reduce screen flickering and enhance user experience while achieving the efficient headroom voltage control.

Figure 3:
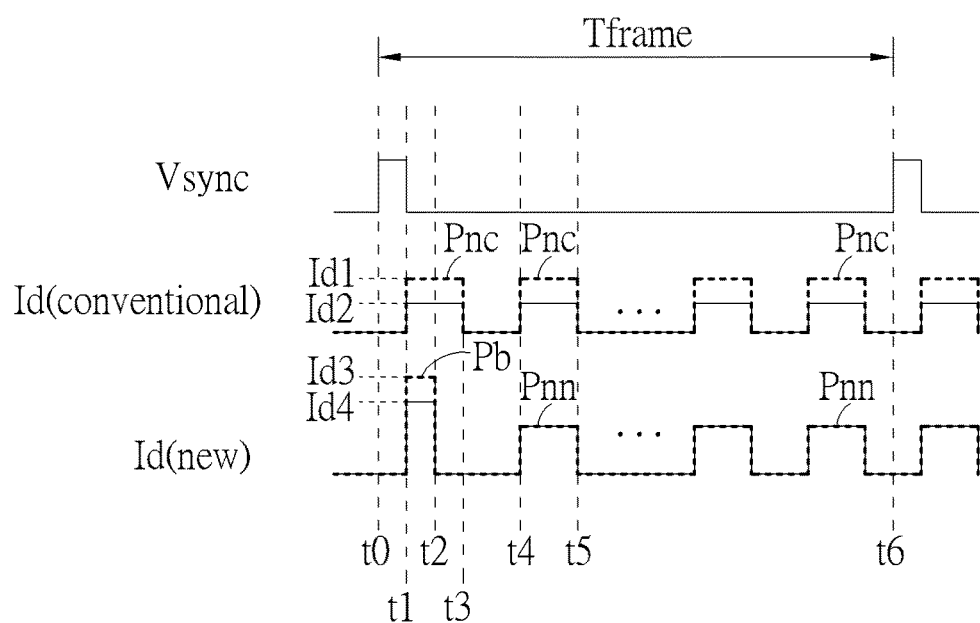
FIG. 3 is a timing diagram of the LED backlight module in FIG. 1.

FIG. 3 is a timing diagram of the LED backlight module 1, where the horizontal axis represents time, and the vertical axis represents voltage for a vertical synchronization signal Vsync and represents current for the conventional driving current Id without the boosted pulse and the new driving current Id with the boosted pulse. The vertical synchronization signal Vsync signals a beginning of a frame of a video, the time interval between the times when the corresponding edges (e.g., the rising edges) of two consecutive pulses in the vertical synchronization signal Vsync occur is referred to as a frame period Tframe. For example, the rising edges of two consecutive pulses occur respectively at Time to and Time t6, and hence, the time interval between Time to and Time t6 is the frame period Tframe. The dotted lines in the conventional driving current Id and the new driving current Id represent the waveforms using an unregulated supply voltage VOUT, and the solid lines in the conventional driving current Id and the new driving current Id represent the waveforms using a regulated supply voltage VOUT. The conventional driving current Id includes normal pulses Pnc equal in magnitude and pulse width. The new driving current Id includes the boosted pulse Pb (e.g., between Time t1 and Time t2) and the plurality of normal pulses Pnn (e.g., between Time t4 and Time t5). In one example, the new driving current Id includes the boosted pulse Pb and 1000 normal pulses Pnn in the frame period Tframe.

For the conventional driving current Id, the supply voltage VOUT may be regulated during each normal pulse Pnc. Therefore, the time interval between Time t1 and Time t6 may be referred to as the regulation period. In FIG. 3, the conventional driving current Id is reduced from Id1 to Id2 during the regulation period. Referring to FIGS. 1 and 3, since the feedback loop in the LED backlight module 1 has a sufficient gain, the feedback voltage Vfb may show no sign of insufficient headroom voltage, and thus, the headroom detection circuit 11 continues to reduce the supply voltage VOUT until the voltage at the first terminal of the driving transistor Td is less than the minimum headroom voltage of the driving transistor Td. The minimum headroom voltage being the voltage for the driving current Id to reduce from an ideal value by a predetermined percentage. For example, if the ideal value of the driving current Id may be 1 mA and the predetermined percentage may be 1%, the minimum headroom voltage is the voltage for the driving current Id to reduce to 0.99 mA. Therefore, by the time insufficient headroom voltage is detected, the conventional driving current Id may be too low, the LED string 13 is unable to generate the desired luminance, resulting in screen flickering. Further, while the headroom detection circuit 11 may raise the supply voltage VOUT via the voltage regulator 15 upon the insufficient headroom detection, the recovery time is long owing to the slow feedback response of the voltage regulator 15, leading to insufficient luminance for a long period, further degrading the user experience.

For the new driving current Id, the supply voltage VOUT may be regulated during the boosted pulse Pb but not during the normal pulses Pnn. Therefore, the time interval between Time t1 and Time t4 may be referred to as the regulation period, and the time interval between Time t4 and Time t6 may be referred to as the normal period. In the embodiment, the new driving current Id is reduced from Id3 to Id4 during the regulation period. Accordingly, since the product of the magnitude and the pulse width of the boosted pulse Pb is equal to the product of the magnitude and the pulse width of the normal pulse Pnn, for the unregulated supply voltage VOUT (dotted line in the new driving current Id), the boosted pulse Pb and the normal pulses Pnn in the new driving current Id may generate a constant average level over the frame period Tframe. As a consequence, while the new driving current Id drops from Id3 to Id4 during the boosted pulse Pb, since the number of the boosted pulse Pb (=1) is significantly less than the number of the normal pulses Pnn (=1000), the reduced luminance is hardly perceivable by the human eye, thereby reducing the screen flickering and enhancing the user experience.

While the new driving current Id includes only one boosted pulse Pb in the embodiment, the invention is not limited thereto, those skilled in the art would recognize that more than one boosted pulse Pb may be included in the new driving current Id to satisfy the design requirements.

Figure 4:
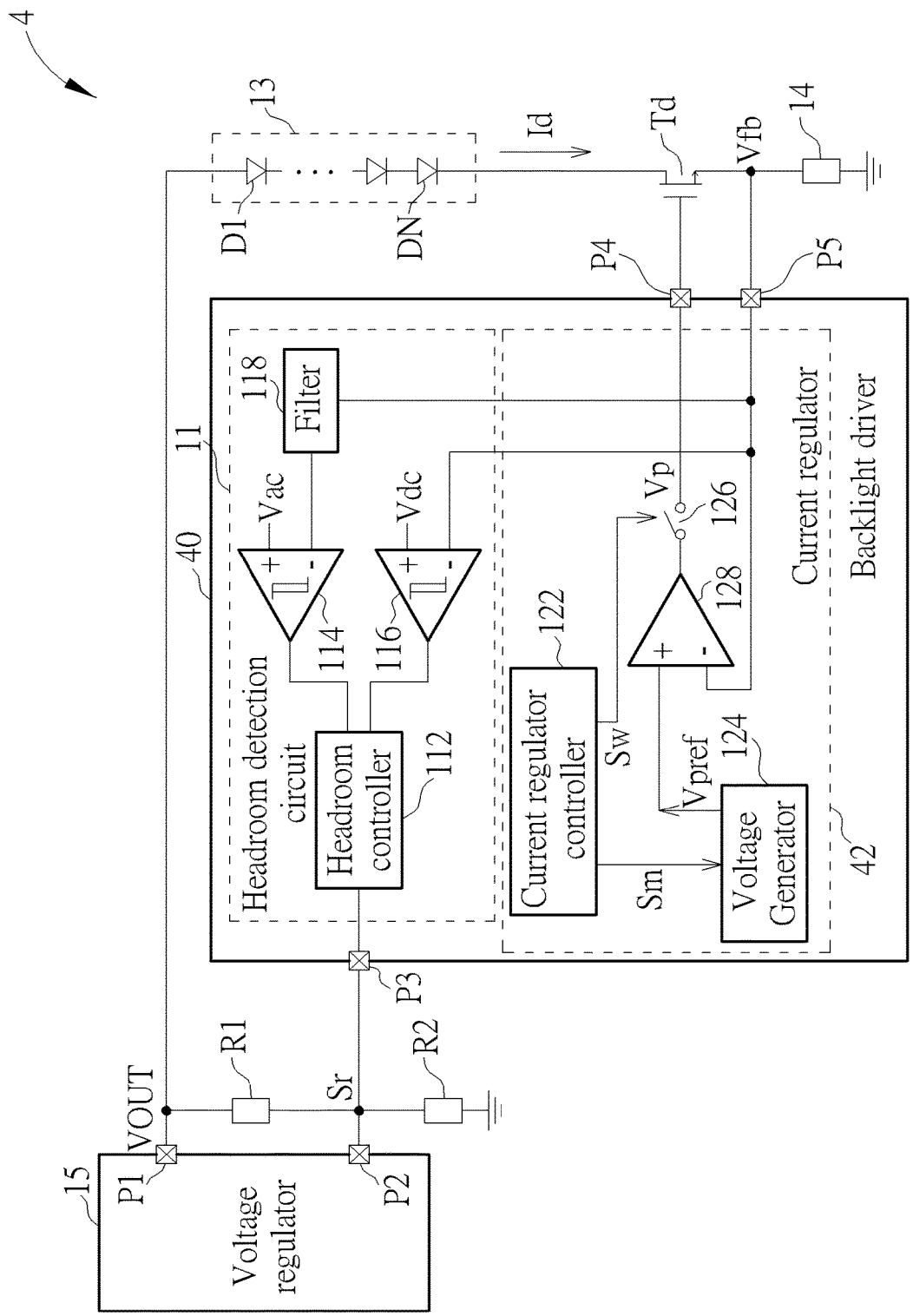
FIG. 4 is a circuit schematic of an LED backlight module according to another embodiment of the invention.

FIG. 4 is a circuit schematic of an LED backlight module 4 according to another embodiment of the invention. The LED backlight module 4 is different the LED backlight module 1 in replacing the current regulator 12 in the backlight driver 10 with a current regulator 42 in a backlight driver 40. The other components in LED backlight module 4 is similar to the LED backlight module 1, the explanation therefor could be found in the preceding paragraphs and will not be repeated for brevity. The following discussion will focus on the current regulator 42.

The current regulator 42 may include the current regulator controller 122, the voltage generator 124, the switch 126 and the operational amplifier 128. The current regulator controller 122, the voltage generator 124, the operational amplifier 128 and the switch 126 may generate a voltage pulse Vp to vary a pulse in the driving current Id. The operational amplifier 128 and the driving transistor Td may form a feedback loop for detecting the feedback voltage Vfb.

The operational amplifier 128 includes an inverting input terminal coupled to the first terminal of the electrical load 14 to receive the feedback voltage Vfb, a non-inverting input terminal coupled to the voltage generator 124 to receive the control reference voltage Vpref, and an output terminal to generate a driving voltage according to the feedback voltage Vfb and the control reference voltage Vpref.

The switch 126 includes a control terminal coupled to the current regulator controller 122 to receive the width control signal Sw, a first terminal coupled to the voltage generator 124 to receive the driving voltage, and a second terminal coupled to the control terminal of the driving transistor Td to generate the voltage pulse Vp according to the driving voltage and the width control signal Sw and control a pulse in the driving current Id according to the voltage pulse Vp.

The configuration of the current regulator controller 122 and the voltage generator 124 and the operations of the current regulator controller 122, the voltage generator 124, the switch 126 and the operational amplifier 128 are similar to the current regulator 12, and the explanation therefor could be found in the preceding paragraphs and will not be repeated for brevity.

Similar to the LED backlight module 1, the LED backlight module 4 may adopt the method 200 to control both the driving current Id and the supply voltage VOUT according to the feedback voltage Vfb, thereby saving the pin count and reducing the manufacturing cost of the backlight driver 40 comparing to the conventional approach of regulating the supply voltage VOUT according to the drain voltage of the driving transistor Td. Further, the current regulator 42 employs the boosted pulse in the driving current Id to reduce screen flickering and enhance user experience while achieving the efficient headroom voltage control.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight driver of driving a light-emitting diode (LED) string via a driving transistor in a load path, the LED string, the driving transistor, and an electrical load being coupled to form the load path, the electrical load comprising a first terminal, and a second terminal coupled to a ground terminal, the backlight driver comprising:
   a current regulator coupled to the driving transistor and the first terminal of the electrical load to control a driving current flowing through the load path according to at least a feedback voltage from the first terminal of the electrical load; and
   a headroom detection circuit directly coupled to the first terminal of the electrical load and a voltage regulator to control the voltage regulator to regulate a supply voltage to a first terminal of the LED string according to at least the feedback voltage directly from the first terminal of the electrical load.

2. The backlight driver of claim 1, wherein the current regulator generates a boosted pulse and a plurality of normal pulses in the driving current in one frame, the boosted pulse having a magnitude exceeding a magnitude of each normal pulse in the plurality of normal pulses, and the boosted pulse having a pulse width less than a pulse width of each normal pulse in the plurality of normal pulses.

3. The backlight driver of claim 2, wherein a product of the magnitude and the pulse width of the boosted pulse is equal to a product of the magnitude and the pulse width of each normal pulse.

4. The backlight driver of claim 1, wherein:
   the driving transistor comprises a control terminal, a first terminal coupled to a second terminal of the LED string, and a second terminal coupled to the first terminal of the electrical load; and
   the current regulator comprises:
      a current regulator controller to generate a magnitude control signal and a width control signal;
      a voltage generator coupled to the current regulator controller to control a magnitude of a control reference voltage according to the magnitude control signal, and output the control reference voltage;
      a switch comprising a control terminal coupled to the current regulator controller to receive the width control signal, a first terminal coupled to the voltage generator to receive the control reference voltage, and a second terminal to generate a voltage pulse according to the control reference voltage and the width control signal; and
      an operational amplifier having an inverting input terminal coupled to the first terminal of the electrical load to receive the feedback voltage, a non-inverting input terminal coupled to the second terminal of the switch to receive the voltage pulse, and an output terminal coupled to the control terminal of the driving transistor to control a pulse in the driving current according to the feedback voltage and the voltage pulse.

5. The backlight driver of claim 1, wherein:
   the driving transistor comprises a control terminal, a first terminal coupled to a second terminal of the LED string, and a second terminal coupled to the first terminal of the electrical load; and
   the current regulator comprises:
      a current regulator controller to generate a magnitude control signal and a width control signal;
      a voltage generator coupled to the current regulator controller to control a magnitude of a control reference voltage according to the magnitude control signal, and output the control reference voltage;

an operational amplifier having an inverting input terminal coupled to the first terminal of the electrical load to receive the feedback voltage, a non-inverting input terminal coupled to the voltage generator to receive the control reference voltage, and an output terminal to generate a driving voltage according to the feedback voltage and the control reference voltage; and a switch comprising a control terminal coupled to the current regulator controller to receive the width control signal, a first terminal coupled to the output terminal of the operational amplifier to receive the driving voltage, and a second terminal coupled to the control terminal of the driving transistor to generate a voltage pulse according to the driving voltage and the width control signal and control a pulse in the driving current according to the voltage pulse.

6. The backlight driver of claim 1, wherein the headroom detection circuit comprises:
a first comparator comprising a first input terminal coupled to the first terminal of the electrical load to receive the feedback voltage, a second input terminal to receive a direct current (DC) reference voltage, and an output terminal to output a first comparison result according to the feedback voltage and the DC reference voltage;
a filter coupled to the first terminal of the electrical load to generate a filtered voltage according to the feedback voltage;
a second comparator comprising a first input terminal coupled to the filter to receive the filtered voltage, a second input terminal to receive an alternating current (AC) reference voltage, and an output terminal to output a second comparison result according to the filtered voltage and the AC reference voltage; and
a headroom controller coupled to the output terminal of the first comparator, the output terminal of the second comparator and the voltage regulator to control the voltage regulator to regulate the supply voltage according to the first comparison result and the second comparison result.

7. The backlight driver of claim 6, wherein if the first comparison result and the second comparison result indicates that the feedback voltage is less than the DC reference voltage and/or the filtered voltage is less than the AC reference voltage, the headroom detection circuit controls the voltage regulator to increase the supply voltage.

8. The backlight driver of claim 6, wherein if the first comparison result and the second comparison result indicates that the feedback voltage exceeds the DC reference voltage and the filtered voltage exceeds the AC reference voltage, the headroom detection circuit controls the voltage regulator to decrease the supply voltage.

9. The backlight driver of claim 1, wherein the headroom detection circuit comprises:
a first comparator comprising a first input terminal coupled to the first terminal of the electrical load to receive the feedback voltage, a second input terminal to receive a direct current (DC) reference voltage, and an output terminal to output a first comparison result according to the feedback voltage and the DC reference voltage; and
a headroom controller coupled to the output terminal of the first comparator and the voltage regulator to control the voltage regulator to regulate the supply voltage according to the first comparison result.

10. The backlight driver of claim 9, wherein if the first comparison result indicates that the feedback voltage is less than the DC reference voltage, the headroom detection circuit controls the voltage regulator to increase the supply voltage.

11. The backlight driver of claim 9, wherein if the first comparison result indicates that the feedback voltage exceeds the DC reference voltage, the headroom detection circuit controls the voltage regulator to decrease the supply voltage.

12. A method of controlling a backlight driver to drive a light-emitting diode (LED) string via a driving transistor in a load path, the LED string, the driving transistor, and an electrical load being coupled to form the load path, the electrical load comprising a first terminal, and a second terminal coupled to a ground terminal, the backlight driver comprising a current regulator and a headroom detection circuit, the current regulator being coupled to the driving transistor and the first terminal of the electrical load, the headroom detection circuit being directly coupled to the first terminal of the electrical load and a voltage regulator, the method comprising:
the current regulator controlling a driving current flowing through the load path according to at least a feedback voltage from the first terminal of the electrical load; and
the headroom detection circuit controlling the voltage regulator to regulate a supply voltage to a first terminal of the LED string according to at least the feedback voltage directly from the first terminal of the electrical load.

13. The method of claim 12, wherein:
the current regulator controlling the driving current flowing through the load path according to at least the feedback voltage from the first terminal of the electrical load comprises:
the current regulator adjusting a magnitude of a boosted pulse in the driving current according to a magnitude control signal and the feedback voltage; and
the current regulator adjusting a pulse width of the boosted pulse according to a width control signal and the feedback voltage;
the method further comprises the headroom detection circuit filtering the feedback voltage to generate a filtered voltage; and
the headroom detection circuit controlling the voltage regulator to regulate the supply voltage to the first terminal of the LED string according to at least the feedback voltage from the first terminal of the electrical load comprises:
the headroom detection circuit controlling the voltage regulator to regulate the supply voltage according to at least the feedback voltage and the filtered voltage.

14. The method of claim 13, wherein the headroom detection circuit controlling the voltage regulator to regulate the supply voltage according to at least the feedback voltage and the filtered voltage comprises:
if the feedback voltage is less than a direct current (DC) reference voltage and/or the filtered voltage is less than an alternating current (AC) reference voltage, the headroom detection circuit controlling the voltage regulator to increase the supply voltage.

15. The method of claim 13, wherein the headroom detection circuit controlling the voltage regulator to regulate the supply voltage according to at least the feedback voltage and the filtered voltage comprises:

if the feedback voltage exceeds a DC reference voltage and the filtered voltage exceeds an alternating current (AC) reference voltage, the headroom detection circuit controlling the voltage regulator to decrease the supply voltage.

16. The method of claim 13, wherein a product of the magnitude and the pulse width of the boosted pulse is equal to a product of a magnitude and a pulse width of a normal pulse in the driving current.

17. The method of claim 13, wherein the driving current includes a boosted pulse and a plurality of normal pulses in one frame.

18. The method of claim 12, wherein the current regulator controlling the driving current flowing through the load path according to at least the feedback voltage from the first terminal of the electrical load comprises:

the current regulator adjusting a magnitude of a boosted pulse in the driving current according to a magnitude control signal and the feedback voltage; and the current regulator adjusting a pulse width of the boosted pulse according to a width control signal and the feedback voltage.

19. The method of claim 18, wherein the headroom detection circuit controlling the voltage regulator to regulate the supply voltage to the first terminal of the LED string according to at least the feedback voltage from the first terminal of the electrical load comprises:

if the feedback voltage is less than a DC reference voltage, the headroom detection circuit controlling the voltage regulator to increase the supply voltage.

20. The method of claim 18, wherein the headroom detection circuit controlling the voltage regulator to regulate the supply voltage to the first terminal of the LED string according to at least the feedback voltage from the first terminal of the electrical load comprises:

if the feedback voltage exceeds a DC reference voltage, the headroom detection circuit controlling the voltage regulator to decrease the supply voltage.

* * * * *